Jan. 7, 1930.　　　　　C. H. ROTH　　　　　1,743,074
WINDSHIELD FOR VEHICLE WHEELS
Filed Feb. 21, 1928
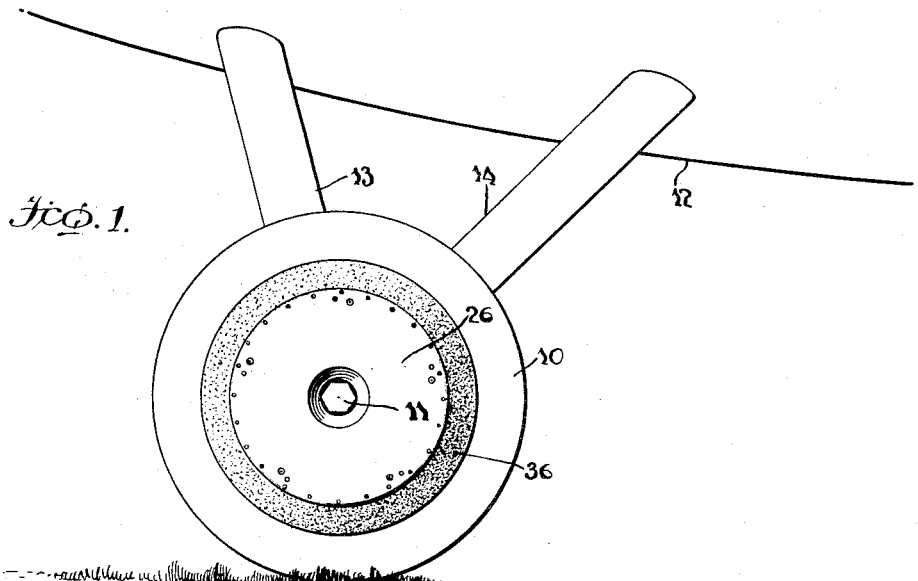
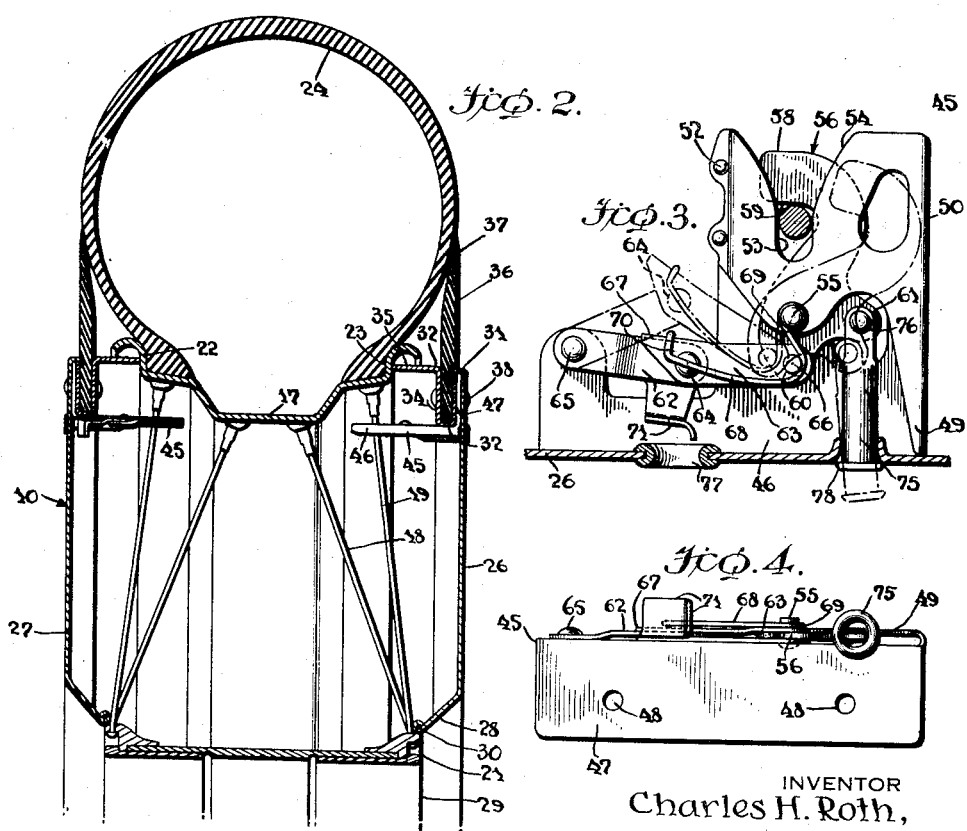
INVENTOR
Charles H. Roth,
BY
ATTORNEY Patented Jan. 7, 1930

1,743,074

UNITED STATES PATENT OFFICE

CHARLES H. ROTH, OF AKRON, OHIO, ASSIGNOR TO THE GOODYEAR TIRE & RUBBER COMPANY, OF AKRON, OHIO, A CORPORATION OF OHIO

WINDSHIELD FOR VEHICLE WHEELS

Application filed February 21, 1928. Serial No. 255,945.

My invention relates to wheels of landing gear for airplanes and it has particular relation to improvements in wind shields applicable to the wheels to provide uniform air resisting surfaces.

In the operation of an airplane, the air resistance of the wheels of the landing gear is an important factor which affects the efficiency of operation of the plane. In order to reduce the air resistance, it has been the practice to provide windshields on each wheel to give thereto what is known as a "stream line" effect. These shields substantially closed the sides of the wheel and presented plane surfaces parallel with the direction of flight. As a result, most of the air resistance to the wheels was applied against the outer surface of the tire.

Some of the shields were secured to the sides of the tire by a flexible fastening flap integral with, and disposed tangentially to, the tire. Other shields were smaller in diameter than the exposed tire surfaces and were secured in abutting relation to either the tire rim or to the spokes of the wheel. In the first type of shield, less air resisting surface was presented than in the latter type, but the cost of constructing the tire with integral fastening flaps was considerably more. In the former type of shield, practically circumferentially continuous connection was necessary between the fastening flap and the shield, whereas in the latter type relatively few fastening devices were necessary.

According to this invention, a shield has been provided which movably and substantially tangentially abuts the outer side surface of the tire and is secured to the wheel by fastening devices connecting the shield to the spokes of the wheel. Relatively few fastening devices are necessary, and therefore the shield quickly may be mounted upon or removed from the wheel.

One of the objects of the invention is to provide a stream line windshield for wheels of airplane-landing gear which receives the hub of the wheel and has an outer portion resiliently held substantially tangentially against the side of the tire.

Another object of the invention is to provide a novel fastening means for releasably connecting a stream-line windshield to the spokes of a wheel.

For a better understanding of the invention, reference may now be had to the accompanying drawings, forming a part of this specification, in which:

Fig. 1 is an elevational view of an airplane landing gear provided with a wheel constructed according to the invention;

Fig. 2 is a fragmentary cross-sectional view on a larger scale of a wheel with the invention applied thereto;

Fig. 3 is an elevational view on a larger scale showing in detail one of the fastening devices employed between the shield and the spokes of the wheel, a portion of the supporting structure being shown in cross-section, and;

Fig. 4 is a plan view of the construction shown by Fig. 3.

Referring to Fig. 1, an airplane wheel 10 is shown rotatably mounted upon an axle 11, that is secured to a fuselage 12 of an airplane by any suitable means, such as struts 13 and 14.

As shown by Fig. 2, the wheel 10 has a hub 16 and a rim 17, inter-connected by a series of metallic spokes 18 and 19. The outer ends of the spokes 18 are connected to the rim inwardly of the outer ends of the spokes 19, but the inner ends of both series of spokes are connected to the hub in the same plane. The inner ends of the spokes are so connected to the hub that an outer peripheral hub surface 21 is exposed. The rim 17 has conventional flanges 22 and 23, respectively, which engage a pneumatic tire 24 mounted upon the rim. The construction so far described, is conventional in wheel constructions for airplane landing gear.

Metallic discs 26 and 27, preferably constructed of aluminum, are provided upon the sides of the wheel. These discs are oppositely disposed but alike in construction; hence, only the disc 26 need be described in detail. This disc has a central portion of frusto-conical shape, as indicated at 28, with a central opening 29 formed therein. The latter opening is defined by the circular edge 30, and is of a diameter sufficiently large to receive an end of the hub. The edge 30 normally rests upon the hub surface 21 and abuts the inner end portions of the spokes 18 and 19. It is to be understood however, that the disc may be varied in shape to adapt the shield to different hub constructions.

The disc extends outwardly adjacent the rim flange 23 and has its outer peripheral edge directed inwardly to form an annular flange 31. An annular portion 32 of channel shape is provided adjacent the outer edge of the disc, and has its sides or legs parallel thereto. The inner leg 34 of the portion 32 has an inwardly laterally extending flange 35, which abuts the side of the rim. An annular rubber lip 36 extends into the channel of the member 32, and has its outer edge tapered, as indicated at 37. The tapered edge 37 abuts the outer side surface of the tire and is held resiliently and movably thereagainst. The channel member 32 and rubber lip 36 are secured to the disc 26 by a plurality of circumferentially spaced rivets 38. While the lip 36 is specified as being composed of rubber, it is apparent that it may be composed of other materials, such as leather, fabric, etc.

The disc 26 is secured to the spokes of the wheel by a plurality of fastening devices 45, which are spaced circumferentially about the inner side of the disc. As best shown by Figs. 3 and 4, each fastening device has a body plate 46, and a portion 47 angularly disposed with respect to the plate, that is provided with rivet openings 48 therein. The plate 46 has an integral part 49 bent reversely at 50 and riveted to one side of the plate by rivets 52. Opposite the angular portion 47, the body plate 46 and the part 49 are provided with registering slots 53 which are so flared outwardly, as indicated at 54, that the spoke 19 of a wheel readily may be directed into the slots. A stud 55 passes through the plate 48 and part 49 and is pivotally secured to an intermediate portion of a latch 56 having a hook 58 formed on its free end. The hook lies between the plate 46 and the part 49 and is movable transversely of the slots 53 for securing a spoke therein. The movement of the hook to inoperative position; that is, out of the slots 53, is limited by the engagement of the back of the hook with the reversely bent portion 50. The edge 59 of the hook adapted to engage a spoke, is curved substantially concentrically of the stud 55, in order that any force exerted by the spoke against the edge 59 will not tend to move the hook to its position indicated by broken lines.

The end of the latch opposite the hook 58 is provided with arms 60 and 61 which, together with the other portion of the latch serve as bell crank levers pivoted upon the stud 55. A pair of links 62 and 63 have their adjacent ends pivotally connected by a pin 64 and have their opposite ends pivoted respectively, to a pin 65 on the body plate 46, and to a pin 66 on the crank arm 60. The links 62 and 63 form what commonly is known as a toggle joint.

The link 63 is provided with a lip 67 which engages the edge of the link 62, whereby the links will be limited in their downward movement to a position slightly beyond that of alignment, as shown by full lines.

A spring 68 connected rotatably at one end 69 to the pin 55 on the plate 48, has its medial portion extending around the pin 66, and then is engaged at its other end 70 by the other end of the link 63. When the pin 64 is in alignment with the pins 55 and 65, the spring 68 is under greater tension than that caused by the pin 64 being in any position on either side of such position of alignment. This is true, because when the pin 64 is in alignment with the pins 55, and 65, the angle defined by the pins 64, 66, and 55 has a lesser magnitude than it would have with the pin 64 in any other position, and consequently the distance between the ends 69 and 70 of the spring is less than it would be if the pin 64 were in any position out of alignment with the pins 55 and 65. Hence, if the pin 64 is moved to either side of the position of alignment with the pins 55 and 65, the spring straightens and continues the movement of the parts until the hook reaches one of the positions illustrated by Fig. 3. Therefore it follows that the spring yieldingly maintains the movable parts of the fastening device in either of their positions shown by full lines and broken lines, respectively.

It will be observed that the latch 56 can not be moved to its inoperative position by any force exerted through the spoke 19, because any force exerted through the spoke acts along a line joining the axes of the stud 55 and spoke 19. There are no moments of force tending to rotate the latch 58 from its operative position. The latch also is maintained positively in its operative position because of the position of the links 62 and 63, as shown in full lines. With the links in their last mentioned positions, clockwise movement of the pin 64 about the pivot 65 is prevented, because the lip 67 on the link 63, engages the link 62, whereas counterclockwise movement is prevented by means of the spring 68. Should there be a moment of force exerted upon the latch 58, tending to move it to its inoperative position, there would be no component force tending to move the pin 64 counterclockwise, against the action of the spring, and consequently the latch 58 would remain in its operative position. The positive locking of the latch 58 and spoke 19 prevents accidental releasing of the latch from the spoke.

The movement of the latch 58 from its operative position to its inoperative position is facilitated by means of a lug 71, secured to the link 62. Pressure against the lug 71 moves the link 62 about the pivot 65, and hence moves the movable parts of the latching device to their inoperative positions. The parts of the latching device are movable to their operative positions by means of a pushrod 75 pivotally secured to the crank arm 61.

The fastening devices are secured to the disc by interposing the angular portions 47 between the channel 32 and the disc 26 and utilizing certain of the rivets 38 to secure the parts in their assembled relation. Openings 77 and 78 are provided adjacent the fastening devices in order that the lug 71 and the rod 75 may be readily accessible from the outside of the wheel. Since the lug and rod are operated by pressure thereagainst, it will be apparent that the openings 77 and 78 only need be large enough to accommodate a small instrument, such as a pencil, screw driver, or the like.

With the fastening devices 45 in their inoperative positions, the shield is applied to the side of the wheel in such manner that the opening 29 receives the hub 16, and the slots 54 in the fastening devices receive certain of the spokes 19. Then the rods 75 are pushed inwardly until the toggle links 62 and 63 snap into their positions shown by full lines of Fig. 3. The springs 68 tend to maintain them in this position. After this operation the hooks 58 are disposed transversely of the slots 54, and hence the spokes are locked within the slots. To release the shield, the lugs 71 are pushed inwardly which results in the breaking of the toggles and the movement of the hooks 58 to positions out of the slots 54. The shield then may be removed from the wheel.

The shields in their operative positions present plane surfaces which are substantially tangential to the outer side surfaces of the tire. Since the sides of the wheels are substantially parallel with the direction of movement thereof, only the forward surface of the tire is effected appreciably by air resistance. The resilient lips 36 maintain the outer margins of the shields tangentially to the sides of the tire, even though flexing of the tire occurs.

From the foregoing description it will be apparent that a wind shield for airplane wheels has been provided which presents a plane surface upon the side of the wheel and which has an outer edge portion resiliently and tangentially held in movable contact with the outer side surface of the tire. It will be apparent also that novel fastening means have been employed to secure the shield to the spokes of the wheel, whereby the shield firmly but releasably is connected to the spokes.

Although I have illustrated only the preferred form which my invention may assume and have described that form in detail, it will be apparent to those skilled in the art that the invention is not so limited but that various modifications may be made therein without departing from the spirit of the invention or from the scope of the appended claims.

What I claim is:

1. The combination with an airplane landing gear, including a wheel and a pneumatic tire on the wheel, of a windshield comprising rigid discs secured to opposite sides of the wheel substantially normal to the axis thereof, and a resilient margin on each disc normally tangential to and movable with respect to the outer surface of the tire.

2. A windshield for airplane wheels having pneumatic tires comprising a pair of rigid discs disposed at opposite sides of the wheel and substantially normal to the axis thereof, each disc being formed with a hub aperture and extending adjacent the outer periphery of the wheel, and a resilient annulus secured to the periphery of each disc engaging tangentially the outer surface of the tire.

3. A fastening device comprising a body plate, having a hook pivoted thereon, a toggle joint pivoted to the hook and to the plate, and a spring rotatably connected to the first pivot extended around the second pivot and connected to one of the toggle links.

4. The combination with an airplane wheel having spokes therein, of a shield therefor, fastening devices for connecting the shield to the spokes, each of the latter devices comprising a body plate connected to the shield, releasable spoke-engaging hooks on the plate, means for moving each of the hooks to and from engagement with the spokes, said means including a pair of elements accessible from the outside of the shield through openings in the latter, one of such elements being adapted to move the hook to its spoke-engaging position and the other of the elements being adapted to move the hook to its disengaged position with respect to a spoke, said elements both being operated by movement in a direction toward the spokes.

5. The combination with an airplane wheel having spokes therein, of a shield therefor, fastening devices for connecting the shield to the spokes, each of the latter devices comprising a body plate connected to the shield, a releasable spoke-engaging hook on the plate, a spring-controlled toggle connected to the hook and plate for retaining the hook either in its inoperative or operative position with respect to a spoke, and a pair of elements secured to the hook and toggle respectively for moving the hook to and from its inoperative position, each of said elements being accessible to the outside of the shield by means of openings in the latter.

6. The combination with an airplane landing gear including a wheel and a pneumatic tire on the wheel, of a windshield comprising rigid discs secured to opposite sides of the wheel substantially normal to the axis thereof, and a resilient rubber margin on each disc normally tangential to and movable with respect to the outer surface of the tire.

7. The combination with an airplane landing gear including a wheel and a pneumatic tire on the wheel, of a windshield comprising rigid discs secured to opposite sides of the wheel substantially normal to the axis thereof, and a resilient margin on each disc normally tangential to and movable with respect to the outer surface of the tire, said discs having portions normally contacting with the tire supporting rim.

8. The combination with an airplane landing gear, including a wheel and a pneumatic tire on the wheel, of a windshield comprising rigid discs secured to opposite sides of the wheel substantially normally to the axis thereof, each disc having a grooved member secured thereto adjacent its outer edge, and a resilient margin partially disposed in the groove of said member and tangentially engaging the tire.

9. The combination with an airplane landing gear, including a wheel and a pneumatic tire on the wheel, of a windshield comprising rigid discs secured to opposite sides of the wheel substantially normally to the axis thereof, each disc having a grooved member secured thereto adjacent its outer edge, and a rubber margin partially disposed in the groove of said member and tangentially engaging the tire.

In witness whereof, I have hereunto signed my name.

Signed at Akron, in the county of Summit and State of Ohio, U. S. A., this 20th day of February, 1928.

CHARLES H. ROTH.